(12) United States Patent
Takenaka et al.

(10) Patent No.: US 12,339,469 B2
(45) Date of Patent: Jun. 24, 2025

(54) LENS UNIT, METHOD FOR PRODUCING LENS SPACER, AND METHOD FOR PRODUCING LENS UNIT

(71) Applicant: Daicel Corporation, Osaka (JP)

(72) Inventors: Hiroki Takenaka, Tokyo (JP); Hiroyuki Hanato, Tokyo (JP); Maki Kishimoto, Tokyo (JP)

(73) Assignee: Daicel Corporation, Osaka (JP)

( * ) Notice: Subject to any disclaimer, the term of this patent is extended or adjusted under 35 U.S.C. 154(b) by 370 days.

(21) Appl. No.: 18/089,690

(22) Filed: Dec. 28, 2022

(65) Prior Publication Data

US 2023/0288614 A1    Sep. 14, 2023

(30) Foreign Application Priority Data

Dec. 28, 2021 (JP) ................................. 2021-214679
Dec. 28, 2021 (JP) ................................. 2021-214840

(51) Int. Cl.
| | |
|---|---|
| *G02B 3/00* | (2006.01) |
| *G02B 7/02* | (2021.01) |
| *G02B 27/00* | (2006.01) |
| *G03B 17/12* | (2021.01) |

(52) U.S. Cl.
CPC ............. *G02B 3/0075* (2013.01); *G02B 7/02* (2013.01); *G02B 27/0018* (2013.01); *G03B 17/12* (2013.01)

(58) Field of Classification Search
CPC .... G02B 3/0075; G02B 7/02; G02B 27/0018; G02B 3/00; G02B 7/021; G02B 7/022; G02B 7/025; G02B 7/026; G03B 17/12; B29D 11/00009
See application file for complete search history.

(56) References Cited

U.S. PATENT DOCUMENTS

2019/0384030 A1    12/2019  Takenaka et al.
2024/0061322 A1*    2/2024  Liu .................... G02B 7/025

FOREIGN PATENT DOCUMENTS

WO    2018/100893 A1    6/2018

* cited by examiner

*Primary Examiner* — James C. Jones
(74) *Attorney, Agent, or Firm* — Morgan, Lewis & Bockius LLP (57) ABSTRACT

There is provided a technique that can suppress generation of flare and/or ghost by incident light reflecting off an inner wall of the spacer in a lens unit including a wafer-level lens and a spacer. A lens unit is formed by joining a lens portion including a lens and a spacer portion including a through hole through which light emitted from the lens passes, in which the spacer portion includes, in an end surface in which the lens portion is joined, an opening portion of the through hole and an inner wall portion, which is a wall surface of an outer edge of the opening portion, and the inner wall portion has a surface roughness greater than a surface roughness of an end surface of the spacer portion opposite to the end surface in which the lens portion is joined.

20 Claims, 9 Drawing Sheets

LENS UNIT, METHOD FOR PRODUCING LENS SPACER, AND METHOD FOR PRODUCING LENS UNIT

TECHNICAL FIELD

The present invention relates to a lens unit in which a wafer-level lens and a spacer are layered, a method for producing a lens spacer used in a wafer-level lens, and a method for producing a lens unit in which a wafer-level lens and a spacer are layered.

BACKGROUND ART

In recent years, electronic devices such as mobile phones, mobile computers, personal digital assistants, and digital still cameras have been dramatically reduced in size and weight, and made to have higher performance. With these market trends, lenses of cameras mounted on the electronic devices are also required to be smaller, thinner, and lighter, and wafer-level lenses are used.

With respect to such wafer-level lenses, it is difficult to integrally mold a lens with a long focal length, and there has been a case where the focal length is implemented by fixing a spacer to the lens with an adhesive to form a lens unit.

In the lens unit as described above, incident light rays are focused on an imaging plane to form an image of a target object. However, trajectory of light rays may deviate from an original design due to influences of such as eccentricity of a diaphragm added to a lens and the lens, inter-surface eccentricity of lenses, variation in thickness, and eccentricity of the lens unit relative to a holder, or an influence of internal reflection of the lens. As a result, particularly in a lens designed with a long focal length, light rays may hit an inner wall of a through hole provided in the spacer and through which light passes. This causes incident light to be specularly reflected by the inner wall of the through hole of the spacer, whereby inconvenience such as flare and/or ghost may be generated on an imaging plane.

CITATION LIST

Patent Document

Patent Document 1: WO 2018/100893

SUMMARY OF INVENTION

Technical Problem

The technique of the present disclosure has been invented in view of the above circumstances, and an object of the present disclosure is to provide a technique that can suppress generation of flare and/or ghost due to specular reflection of incident light on an inner wall of a through hole of a spacer in such a lens unit including a wafer-level lens and a spacer.

Solution to Problem

To solve the above-described problem, a lens unit according to the present disclosure is a lens unit formed by joining a lens portion including a lens and a spacer portion including a through hole through which light emitted from the lens passes, in which the spacer portion includes, in an end surface of the spacer portion in which the lens portion is joined, an opening portion of the through hole and an inner wall portion, which is a wall surface of an outer edge of the opening portion, and the inner wall portion has a surface roughness greater than a surface roughness of an end surface of the spacer portion opposite to the end surface of the spacer portion in which the lens portion is joined.

With this configuration, light irradiated on the inner wall portion of the spacer portion through the lens portion is diffusely reflected or scattered by the roughened surface, and it can be suppressed that the light irradiated on the inner wall portion is specularly reflected and is directly incident on an image capturing sensor fixed to the spacer portion to generate flare and/or ghost.

A surface roughness of the inner wall portion may be 0.3 µm or greater and 4 µm or less.

A groove portion formed to extend perpendicular to a central axis of the through hole may be provided in the end surface of the spacer portion opposite to the end surface of the spacer portion on which the lens portion is joined, and the opening portion and the groove portion may communicate with each other to form the through hole. A surface roughness of the groove portion may be 0.3 µm or greater and 4 µm or less. This makes it possible to suppress specular reflection of light emitted from the lens on both the inner wall surface of the opening portion and the groove portion, which form the through hole, whereby generation of flare and/or ghost can be more reliably suppressed in the imaging plane of the image capturing sensor.

The lens portion and the spacer portion may be joined to each other by being fixed with an adhesive radially outside the lens and the opening portion. This allows the lens portion and the spacer portion to be fixed efficiently without affecting an optical path of the light.

On an end surface of the lens portion on which the spacer portion is joined, an outer peripheral portion, which is an annular-shaped convex portion abutting against the spacer portion when the lens portion is joined to the spacer portion, may be provided to surround the lens, and a filling portion to be filled with an adhesive for fixing the lens portion and the spacer portion may be provided on a further outer periphery of the outer peripheral portion. This makes it possible to more reliably fix the lens portion and the spacer portion radially outside the lens and the opening portion.

A region of the lens portion radially outside the lens on the surface of the lens portion opposite to a surface of the lens portion on which the spacer portion is joined may be formed in a planar shape, and the surface of the lens portion opposite to the surface of the lens portion on which the spacer portion is joined may not include a portion protruding from the region formed in the planar shape. This makes it possible to ensure adhesive force in a case where the lens portion of the lens unit is attached to a tape or the like to be fixed, which can enhance reliability of the work.

To solve the problem described above, a method for producing a lens spacer according to the present disclosure is a method for producing a lens spacer including a through hole through which light emitted from a lens passes and including, in an end surface proximate to the lens, an opening portion of the through hole and an inner wall portion, which is a wall surface of an outer edge of the opening portion, and includes opening portion molding of molding a molded product using an upper mold having a planar shape and a lower mold including a convex portion having a substantially truncated cone shape for forming the opening portion, and forming the opening portion and the inner wall portion in a first surface of the molded product, and groove portion forming of forming a groove portion extending perpendicular to a central axis of the opening portion on a second surface, which is a surface opposite to the first surface, of the molded product, and causing the groove portion and the opening portion to communicate with each other, in which a side surface of the convex portion of the lower mold has a surface roughness greater than a surface roughness of the upper mold.

To solve the problem described above, a method for producing a lens spacer according to the present disclosure is a method for producing a lens spacer including a through hole through which light emitted from a lens passes and including, in an end surface proximate to the lens, an opening portion of the through hole and an inner wall portion, which is a wall surface of an outer edge of the opening portion, and includes opening portion molding of molding a molded product using an upper mold having a planar shape and a lower mold including a convex portion having a substantially truncated cone shape for forming the opening portion, and forming the opening portion and the inner wall portion in a first surface of the molded product, groove portion forming of forming a groove portion extending perpendicular to a central axis of the opening portion in a second surface, which is a surface opposite to the first surface, of the molded product, and causing the groove portion and the opening portion to communicate with each other, and roughening a surface roughness of the inner wall portion.

According to these production methods, the surface roughness of the inner wall surface of the lens spacer to be produced has a surface roughness greater than the surface roughness of the surface of the lens spacer opposite to the surface of the lens spacer proximate to the lens. Thus, light irradiated on the inner wall portion of the spacer through the lens is diffusely reflected or scattered by the surface having rough surface roughness. As a result, it can be suppressed that the light irradiated on the inner wall portion is specularly reflected and directly incident on a sensor or the like fixed to the spacer to generate flare and/or ghost on an imaging plane of the sensor.

The molded product may be made of a resin material. This makes it possible to achieve good workability in groove portion forming, and thus it is possible to more reliably or more easily produce a spacer having an inner wall surface with a surface roughness greater than a surface roughness of a surface of the spacer opposite to a surface of the spacer proximate to a lens.

To solve the problem described above, a method for producing a lens unit according to the present disclosure is a method for producing a lens unit formed by joining a lens portion including a lens and a spacer portion including a through hole through which light emitted from the lens passes and including, in an end surface proximate to the lens, an opening portion of the through hole and an inner wall portion, which is a wall surface of an outer edge of the opening portion, and includes lens portion molding of molding the lens portion, opening portion molding of molding the spacer portion using an upper mold having a planar shape and a lower mold including a convex portion having a substantially truncated cone shape for forming the opening portion, and forming the opening portion and the inner wall portion of the spacer portion, groove portion forming of forming a groove portion extending perpendicular to a central axis of the opening portion in an end surface of the spacer portion opposite to an end surface of the spacer portion on which the lens portion is joined, and causing the groove portion and the opening portion to communicate with each other, and joining the lens portion, and the spacer portion after the groove portion forming by fixing the lens portion and the spacer portion with an adhesive, in which a side surface of the convex portion has a surface roughness greater than a surface roughness of the upper mold.

To solve the problem described above, the method for producing a lens unit according to the present disclosure is a method for producing a lens unit formed by joining a lens portion including a lens and a spacer portion including a through hole through which light emitted from the lens passes and including, in an end surface proximate to the lens, an opening portion of the through hole and an inner wall portion, which is a wall surface of an outer edge of the opening portion, and includes lens portion molding of molding the lens portion, opening portion molding of molding the spacer portion using an upper mold having a planar shape and a lower mold including a convex portion having a substantially truncated cone shape for forming the opening portion, and forming the opening portion and the inner wall portion of the spacer portion, groove portion forming of forming a groove portion extending perpendicular to a central axis of the opening portion in an end surface of the spacer portion opposite to an end surface of the spacer portion on which the lens portion is joined, and causing the groove portion and the opening portion to communicate with each other, roughening a surface roughness of the inner wall portion, and joining the lens portion, and the spacer portion after the groove portion forming with an adhesive.

According to these production methods, the surface roughness of the inner wall surface of the spacer portion is greater than the surface roughness of the surface of the spacer portion opposite to the surface of the spacer portion on which the lens portion is joined. Thus, light irradiated on the inner wall portion of the spacer portion through the lens portion is diffusely reflected or scattered by the surface having rough surface roughness. As a result, it can be suppressed that the light irradiated on the inner wall portion is specularly reflected and directly incident on a sensor or the like fixed to the spacer portion to generate flare and/or ghost on an imaging plane of the sensor.

The spacer portion may be made of a resin material. This makes it possible to achieve good workability in groove portion forming, and thus it is possible to more reliably or more easily to produce a lens unit in which the surface roughness of the inner wall surface of the spacer portion is greater than the surface roughness of the surface of the spacer portion opposite to the surface of the spacer portion on which the lens portion is joined.

In the joining, the lens portion and the spacer portion may be joined to each other by being fixed with an adhesive radially outside the lens and the opening portion. This allows the lens portion and the spacer portion to be fixed efficiently without affecting an optical path of the light.

In the lens portion molding, a lens portion sheet in which a plurality of the lens portions are arranged is molded. In the opening portion molding, a spacer portion sheet in which a plurality of the spacer portions are arranged is molded, and the opening portion and the inner wall portion of each of the plurality of the spacer portions are formed. In the groove portion forming, a plurality of the groove portions are formed, and the opening portion of each of the plurality of the spacer portions and the corresponding one of the plurality of the groove portions are caused to communicate with each other. In the joining, the lens portion sheet, and the spacer portion sheet after the groove portion forming are fixed with an adhesive to join each of the plurality of the lens portions and the corresponding one of the plurality of the spacer portions. The method further includes cutting the lens portion sheet and the spacer portion sheet that are fixed with the adhesive by dicing into a combination including each of the plurality of the lens portions and the corresponding one of the plurality of the spacer portions that are joined.

This makes it possible to mold a large number of lens portions and spacer portions at a time and produce a large number of lens units at a time.

In the cutting, of the lens portion sheet, and the spacer portion sheet after the groove portion forming that are fixed with the adhesive, dicing is performed after the lens portion sheet side is attached to a tape to be fixed.

This makes it possible to fix the lens portion sheet and the spacer portion sheet to the tape in a manner where the spacer portion sheet is exposed to the outside. As a result, even when chips generated during dicing are attached to the lens portions and the spacer portions that have been cut, the chips can be dissipated to the outside through the through hole of each of the spacer portions, and thus it is possible to remove the chips by spinner washing or the like.

Note that, in the present invention, wherever possible, the techniques for solving the above-described problem can be used in combination.

Advantageous Effects of Invention

According to the present disclosure, in a lens unit including a wafer-level lens and a spacer, it is possible to suppress generation of flare and/or ghost due to incident light being specularly reflected by an inner wall of a through hole of the spacer.

DESCRIPTION OF EMBODIMENTS

Examples

A lens unit according to an embodiment of the present disclosure will be described below with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiment and is limited only by the claims.

Figure 1A:
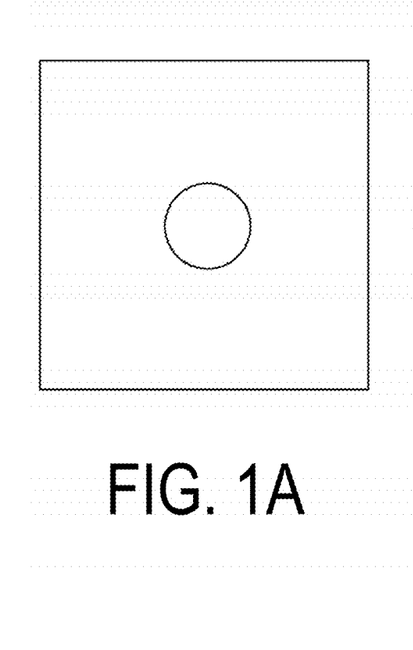
FIG. 1A to FIG. 1C each are a schematic diagram of a lens unit.
Figure 1B:
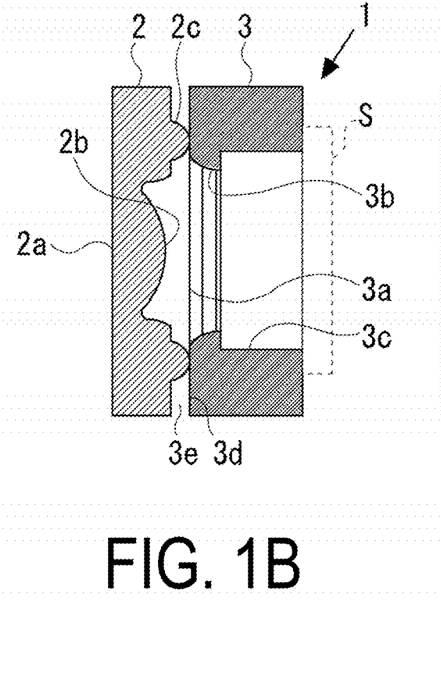
Figure 1C:
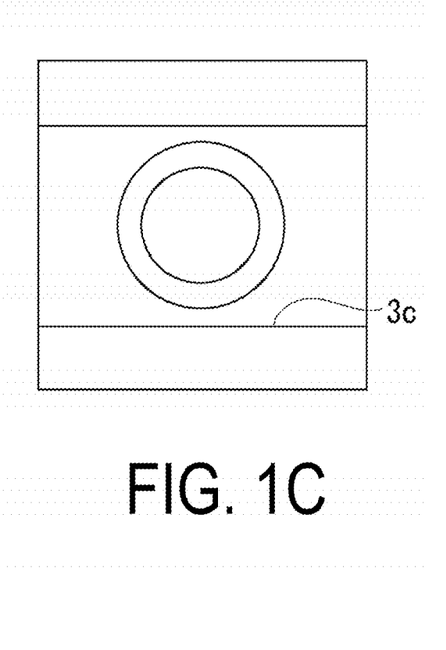

FIG. 1A, FIG. 1B, and FIG. 1C each illustrate a lens unit 1 in the present embodiment. FIG. 1A is a front view of the lens unit 1 when viewed from the lens side (incident side), FIG. 1B is a cross-sectional view of the lens unit 1 when viewed from a direction perpendicular to an optical axis, and FIG. 1C is a rear view of the lens unit 1 when viewed from a spacer side (emitting side). The lens unit 1 is formed by joining a lens portion 2 including a wafer-level lens made of a resin and a spacer portion 3 by adhesion. In the lens unit 1, a sensor S such as an imaging element is mounted on the spacer portion 3, and thus it is possible to focus incident light on an imaging plane of the sensor S to generate an image.

In the present embodiment, the lens portion 2 includes an incident surface 2a formed in a substantially planar shape, which is a surface on which light is incident, a lens surface 2b from which the light incident from the incident surface 2a is emitted, and an outer peripheral portion 2c protruding in an annular shape to surround the lens surface 2b. The outer peripheral portion 2c abuts against the spacer portion 3 when the lens portion 2 and the spacer portion 3 are joined to define a distance between the lens surface 2b and the imaging plane of the sensor S. A tip portion in the cross-sectional shape of the outer peripheral portion 2c has a curved shape, and thus mold releasability during molding of the lens portion 2 can be enhanced, and the outer peripheral portion 2c can be stably abut against a front end surface 3d (to be described below) having a planar shape of the spacer portion 3.

As illustrated in FIG. 1B, the spacer portion 3 includes an opening 3a through which the light emitted from the lens portion 2 passes, in an end surface of the spacer portion 3 on which the lens portion 2 is joined. An inner wall portion 3b that defines an outer edge of the opening 3a formed to have a wider inner diameter toward the lens portion 2 is provided around the opening 3a. Furthermore, the spacer portion 3 includes a groove portion 3c that is a groove-shaped concave structure extending in a direction perpendicular to the optical axis in a surface on which the sensor S is mounted.

The outer peripheral portion 2c of the lens portion 2 abuts against the front end surface 3d that is a surface of the spacer portion 3 proximate to the lens portion 2, as described above. A void portion 3e which is to be filled with an adhesive for fixing the lens portion 2 and the spacer portion 3 in a joined state is formed on an outer periphery of a portion where the front end surface 3d of the spacer portion 3 and the outer peripheral portion 2c of the lens portion 2 abut against each other. A surface roughness of the inner wall portion 3b around the opening 3a is from 0.3 μm to 4 μm and is greater than that of another surface of the spacer portion 3. The surface roughness of the inner wall portion 3b is from 0.3 μm to 4 μm, which prevents light emitted from the lens portion 2 and specularly reflected by the inner wall portion 3b from being directly applied to the imaging plane of the sensor S to generate flare and/or ghost.

Note that the material of the spacer portion 3 is assumed to be a resin material, but the color thereof is not particularly limited. A transparent or colored material may be used. In this case, light-shielding pigment or dye that absorbs a specific wavelength may be contained in the resin material to make the colored material. More specifically, the resin material may contain carbon black or titanium black or may contain a cyanine compound, a phthalocyanine compound, a dithiol metal complex, a naphthoquinone compound, a diimmonium compound, an azo compound, or the like as the specific wavelength absorbing dye.

Figure 2A:
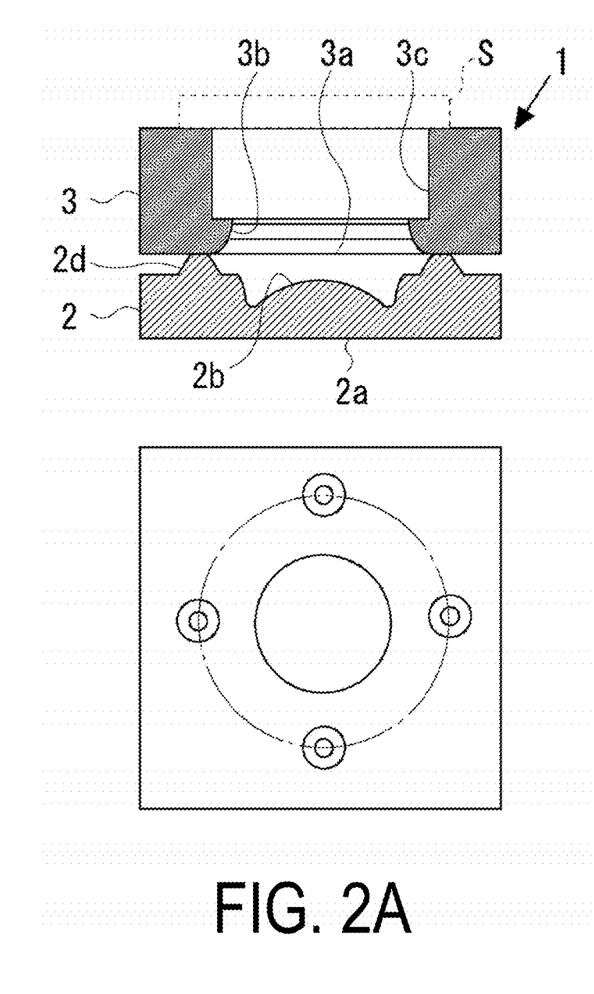
FIG. 2A and FIG. 2B are diagrams illustrating examples of different structures of an abutting point between a lens portion and a spacer portion.
Figure 2B:
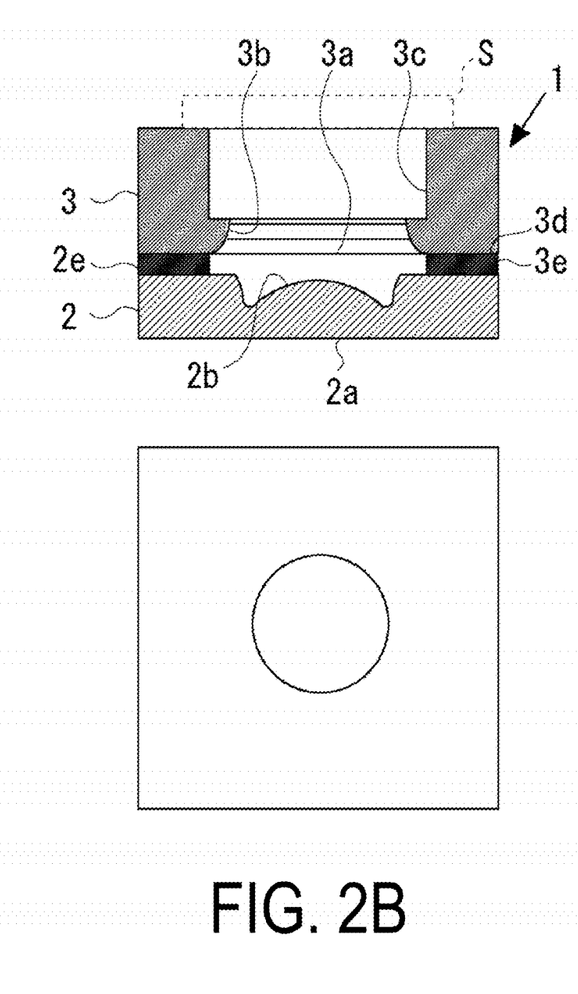

Note that in the above description, the outer peripheral portion 2c having an annular shape is provided to abut against the spacer portion 3 when the lens portion 2 and the spacer portion 3 are joined to each other to define a distance between the lens surface 2b and the imaging plane of the sensor S, but the structure for performing this function is not limited thereto. For example, as illustrated in FIG. 2A, a plurality (four in an example of FIG. 2A) of protrusions 2d each having a trapezoidal shape or a spherical shape may be disposed around the lens surface 2b. Alternatively, as illustrated in FIG. 2B, the gap between the lens portion 2 and the spacer portion 3 may be defined using a gap control adhesive 2e in which spherical particles are blended.

Figure 3A:
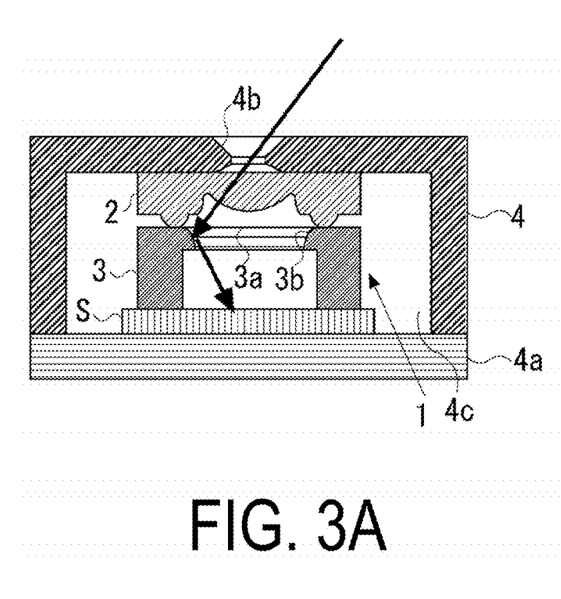
FIG. 3A and FIG. 3B each are a cross-sectional view illustrating a state in which the lens unit is incorporated into a holder.
Figure 3B:
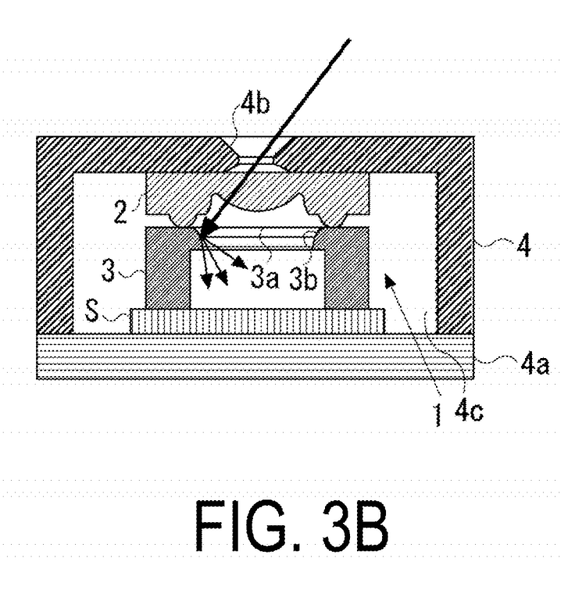

FIG. 3A and FIG. 3B each are a cross-sectional view illustrating a state in which the lens unit 1 is incorporated into a holder 4 for mounting the lens unit 1 on, for example, an imaging device (not illustrated). The holder 4 has, for example, prismatic or columnar outline and includes a housing chamber 4c that is a space for housing the lens unit 1 therein, as illustrated in FIG. 3A. The lens unit 1 and the sensor S are housed in the housing chamber 4c by fixing the lens unit 1 and the sensor S to a ceiling surface of the housing chamber 4c and further fixing a base 4a to the holder 4 in such a manner that the base 4a closes the housing chamber 4c of the holder 4. An incident hole 4b through which incident light is incident is provided on a top surface of the holder 4. The incident hole 4b is provided with a portion that has a minimum diameter in the middle of an optical axis direction, and the portion has a function as a diaphragm. Note that the shape of the holder 4 described above is an example, and there is no particular limitation.

Originally, the incident light incident on the lens unit 1 is incident from the incident hole 4b of the holder 4, passes through the lens portion 2, passes through the opening 3a of the spacer portion 3, and is focused on the imaging plane of the sensor S to form an image. However, incident light rays may deviate from an original design due to influences of manufacturing variation such as eccentricity of the incident hole 4b and the lens portion 2, inter-surface eccentricity in the lens portion 2, a thickness difference, or eccentricity of the lens portion 2 and the holder 4 or due to an influence of internal reflection of the lens portion 2, or the like. As a result, particularly in the lens portion 2 of a design having a long focal length, light rays may hit the inner wall portion 3b of the spacer portion 3.

As a result, light rays that are not assumed at the time of design may be specularly reflected on the inner wall portion 3b of the spacer portion 3, and the sensor S may be irradiated with the reflected light to generate flare and/or ghost. In contrast, in the present embodiment, the surface roughness of the inner wall portion 3b of the spacer portion 3 is made greater than that of another surface of the spacer portion 3 and is set to from 0.3 µm to 4 µm. With this configuration, even if the light rays that are not assumed at the time of design hit the inner wall portion 3b of the spacer portion 3, as illustrated in FIG. 3B, the light rays are diffusely reflected or scattered to be prevented from being specularly reflected and directly irradiated to the sensor S. As a result, it is possible to suppress generation of flare and/or ghost.

Note that Table 1 below shows experimental results indicating relationships between surface roughness of the inner wall portion 3b and presence or absence of flare generation.

TABLE 1

| Treatment method | Untreated | Surface roughening | | | | | | | | | | | |
|---|---|---|---|---|---|---|---|---|---|---|---|---|---|
| Surface roughness [µm] | 0.018 | 0.157 | 0.304 | 0.363 | 0.387 | 0.411 | 0.477 | 0.564 | 0.612 | 1.542 | 2.078 | 2.730 | 3.800 |
| Flare result *1 | Poor | Poor | Good | Good | Good | Good | Good | Good | Good | Good | Good | Good | Good |

*1 Evaluated as Poor when flare is generated, and evaluated as Good when no flare is generated.

In this way, it has been found that when the surface roughness of the inner wall portion 3b is set to 0.3 µm or greater and 4 µm or less, it is possible to suppress generation of flare. Note that in the flare evaluation, Ghost/Flare phenomenon evaluation system GCS-2T (available from TSUBOSAKA ELECTRIC Co., Ltd,) was used, incident light having a half angle of view of 47.5 degrees was incident from an object surface, and generation of flare was visually evaluated using an image.

Method for Producing a Wafer-Level Lens

Next, a method for producing the lens portion 2 and the spacer portion 3 in the present embodiment will be described. The lens portion 2 in the present embodiment is obtained by molding a curable composition (resin material) by an imprint molding method or an injection molding method. Note that a material of a forming mold used for molding the lens portion 2 is not particularly limited and may be, for example, any of metals, glass, plastic, or the like.

As a method for molding the lens portion 2, for example, a method includes (1) step 1: a step of preparing a lens forming mold (not illustrated) having one or more lens molds, (2) step 2: a step of bringing a curable composition into contact with or injecting the curable composition into the lens forming mold after step 1, and (3) step 3: a step of curing the curable composition by heating and/or light irradiation after step 2. When heating is performed in step 3, the temperature can be adjusted as appropriate depending on components to be subjected to the reaction, a type of catalyst, and the like, and is not particularly limited but may be, for example, approximately 100 to 200° C. On the other hand, when light irradiation is performed in step 3, a UV-LED, a mercury lamp, a xenon lamp, a carbon arc lamp, a metal halide lamp, sunlight, an electron beam source, a laser light source, or the like can be used as the light source, for example.

In the molding method described above, after step 3, (4) step 4: a step of annealing the cured curable composition may be further included. The detail of this annealing is not particularly limited, but the annealing may be performed by heating at a temperature of 100 to 200° C. for approximately 30 minutes to 1 hour, for example. Note that the annealing can be performed after removing the lens forming mold and can be performed without removing the lens forming mold.

In the molding method described above, a sheet-shaped cured product (lens sheet 22) formed in a state in which one or more lens portions 2 are continuously connected to each other may be usually obtained by step 3 or step 4. The lens sheet 22 corresponds to the lens portion sheet in the present disclosure. In a case where the lens sheet 22 has a plurality of lens portions 2, these lens portions 2 may be regularly arranged (aligned) or may be randomly arranged. The lens sheet 22 described above is cut by dicing to remove excess portions, and thus the lens portions 2 illustrated in FIG. 1A and FIG. 1B can be obtained. That is, after step 3 or step 4, (5) step 5: a step of cutting the cured curable composition (lens sheet 22) may be further included. The cutting of the cured curable composition of the embodiment of the present invention can be performed by a known or common processing means or the like. The method for producing a wafer-level lens described above corresponds to the lens portion molding in the present disclosure.

Method for Producing Spacer

Figure 4A:
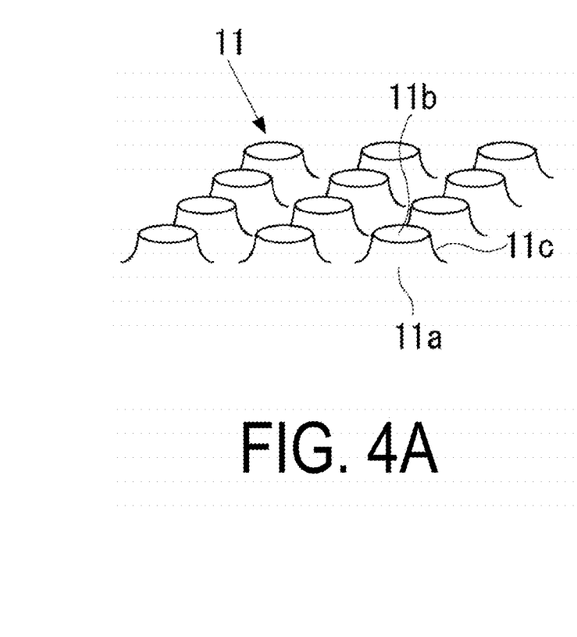
FIG. 4A and FIG. 4B each are a diagram illustrating a shape of a forming mold of a spacer.
Figure 4B:
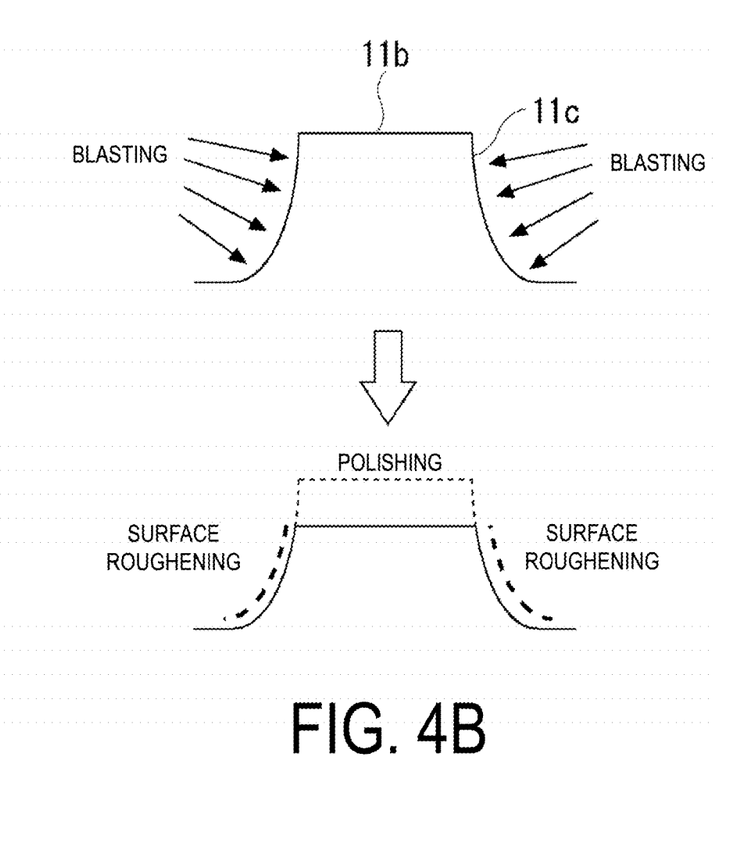

Next, a method for producing the spacer portion 3 will be described. The spacer portion 3 is produced by steps corresponding to steps 1 to 5 described above, which is molding of the curable composition, similarly to the lens portion 2. Here, description of the steps corresponding to steps 1 to 5 is omitted. Alternatively, the spacer portion 3 may be formed by imprint molding. FIG. 4A and FIG. 4B each illustrate a shape of a lower mold 11 for forming the front end surface 3d of the spacer portion 3. Similarly to the molding of the lens portion 2 described above, a plurality of protrusions 11a for forming the openings 3a of the spacer portions 3 are arranged in the lower mold 11 to mold a plurality of the spacer portions 3 as the spacer sheet 23.

The protrusion 11a has a generally conical shape whose diameter becomes smaller upward in the drawing and includes an upper end 11b having a planar shape. The inner wall portion 3b of the spacer portion 3 is formed by an inclined surface 11c on the side surface of the protrusion 11a. As illustrated in FIG. 4B, the surface roughness of the inclined surface 11c is made greater in advance by blasting. In addition, after blasting, the upper end 11b of the protrusion 11a is polished, and the surface roughness is adjusted to be less than the inclined surface 11c. This is a procedure for facilitating mold release of the lower mold 11 after molding. Note that the protrusion 11a corresponds to the convex portion in the present disclosure.

Figure 5A:
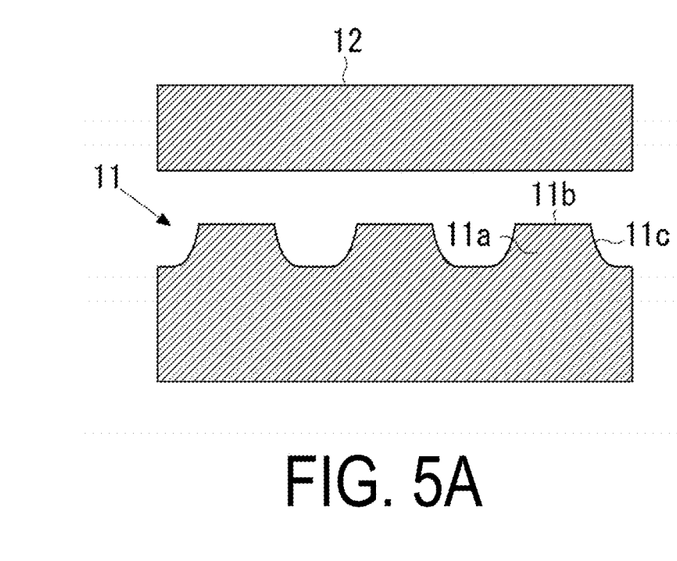
FIG. 5A and FIG. 5B are diagrams illustrating the forming mold of the spacer and a processing method after molding.
Figure 5B:
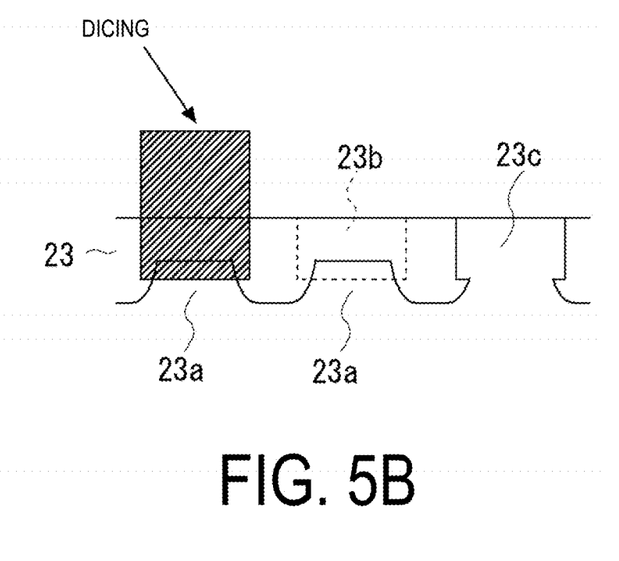

FIG. 5A illustrates disposition of the lower mold 11 and the upper mold 12 for molding a sheet-shaped cured product (spacer sheet 23) formed in a state in which one or more lens portions 2 are continuously connected. As described above, the protrusions 11a are formed on the lower mold 11 by the number of the spacer portions 3 to be molded at one time. On the other hand, the upper mold 12 has a planar surface. FIG. 5B illustrates the spacer sheet 23 molded from the lower mold 11 and the upper mold 12. The spacer sheet 23 is a sheet-shaped molded product in which a plurality of recessed portions 23a each of which is to be the opening 3a and the inner wall portion 3b are formed on the lower side and the upper side is planar, when molding is completed. Note that the spacer sheet 23 corresponds to the spacer portion sheet in the present disclosure. Furthermore, molding of the spacer sheet 23 using the lower mold 11 and the upper mold 12 corresponds to the opening portion molding in the present disclosure. The spacer sheet 23 is half-cut from the upper side by dicing to form a groove 23b to be the groove portion 3c, and the groove 23b and the recessed portion 23a are connected to form a hole 23c penetrating from the upper side to the lower side of the spacer sheet 23. The hole 23c is a through hole in the spacer portion 3 after the cutting. This step corresponds to the groove portion forming in the present disclosure. The lower surface of the spacer sheet 23 corresponds to the first surface in the present disclosure. The upper surface of the spacer sheet 23 corresponds to the second surface in the present disclosure.

Figure 6A:
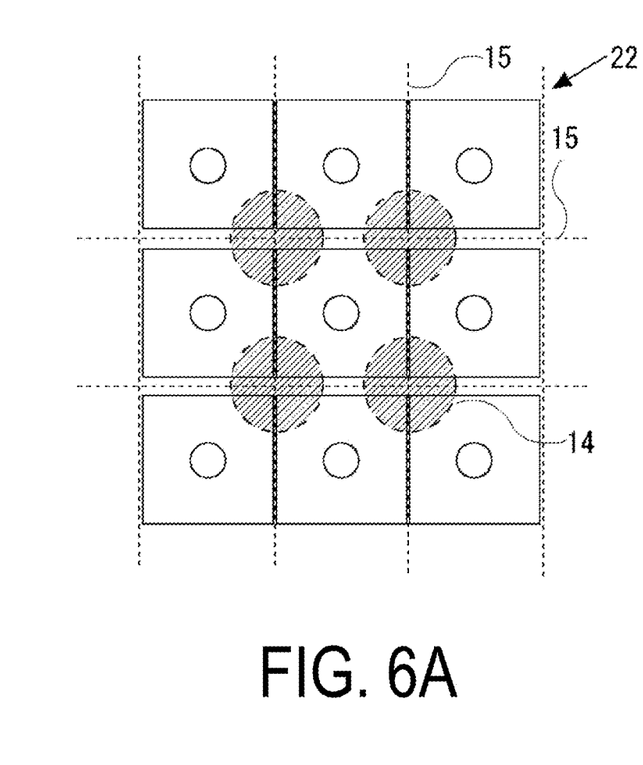
FIG. 6A and FIG. 6B are diagrams illustrating adhesive locations of a lens sheet and a spacer sheet, cut-out locations after adhesion, and a void portion, which is to be filled with an adhesive, between the lens and the spacer.

After the lens sheet 22 and the spacer sheet 23 are molded, the lens sheet 22 and the spacer sheet 23 are fixed with an adhesive (e.g., UV curable adhesive) in such a manner that optical axes of lenses and central axes of the holes 23c coincide and then cut by dicing to cut out a plurality of lens units 1. FIG. 6A illustrates fixing locations 14 when the molded lens sheet 22 and the molded spacer sheet 23 are fixed with the adhesive, and trajectories 15 of a cutter when the lens sheet 22 and the spacer sheet 23 after adhesion are cut by dicing. This step corresponds to the joining and the cutting in the present disclosure.

Figure 6B:
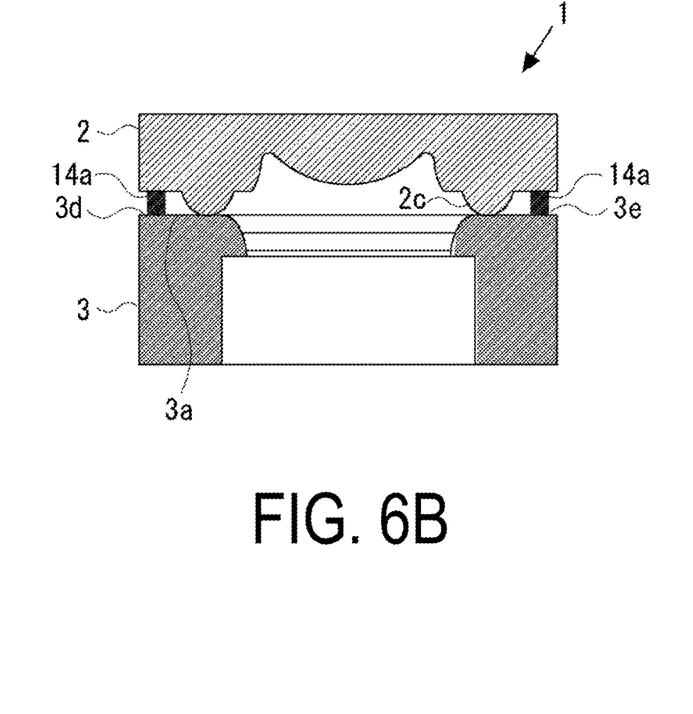

Hatched circles drawn with dashed lines in FIG. 6A indicate the fixing locations 14 by the adhesive. In addition, thick dashed crisscrossing straight lines indicate the trajectories 15 of the cutter. Note that, as illustrated in FIG. 6A, the adhesive only need be applied to four corners of the portion to be the lens unit 1. FIG. 6B illustrates a cross-sectional view of the lens portion 2, the spacer portion 3, and the adhesive 14a in the lens unit 1 after cutting. As illustrated in FIG. 6B, a void portion 3e to be filled with the adhesive 14a between lens portion 2 and the spacer portion 3 is formed outside an abutted portion between the outer peripheral portion 2c of the lens portion 2 and the front end surface 3d of the spacer portion 3. If a height of the void portion 3e is in the range of 10 μm to 500 μm, it is possible to fill the void portion 3e with a sufficient amount of the adhesive 14a. Here, the lens unit 1 after cutting out corresponds to the combination of the lens portion and the spacer portion in the present disclosure.

Figure 7A:
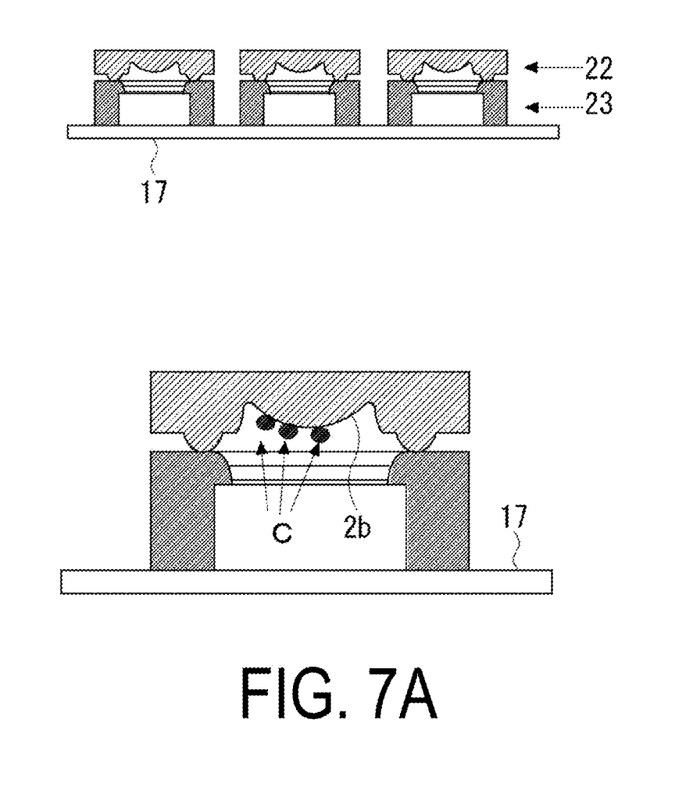
FIG. 7A and FIG. 7B each are a diagram illustrating a fixing method when cutting out a lens unit from the lens sheet and the spacer sheet, and a state of chips.
Figure 7B:
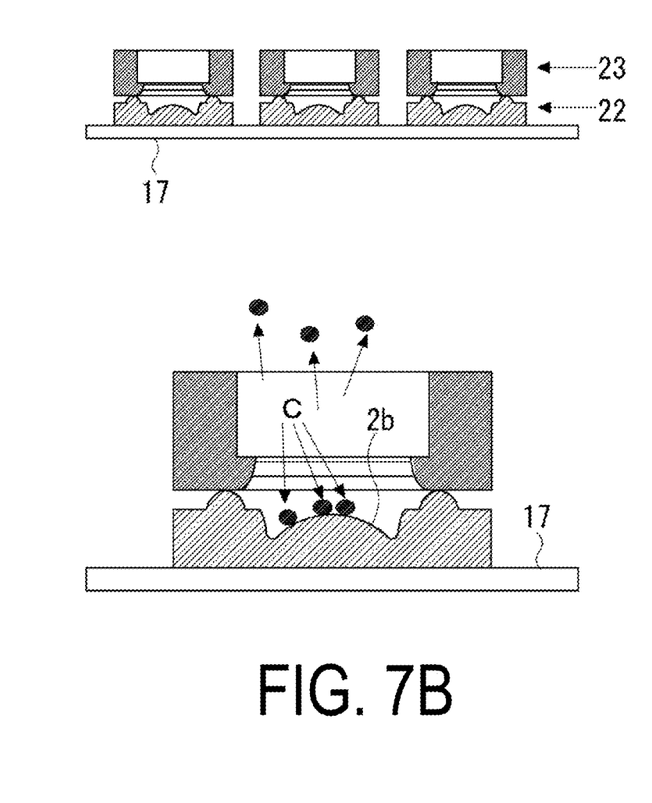

Note that when the lens sheet 22 and the spacer sheet 23 are cut out by dicing, the lens sheet 22 and the spacer sheet 23 are attached to a tape 17 to be fixed as illustrated in the upper part of each of FIG. 7A and FIG. 7B, and then dicing is performed. At the time, there may be a case where the side of the spacer sheet 23 is attached to the tape 17 as illustrated in the upper part of FIG. 7A and a case where the side of the lens sheet 22 is attached to the tape 17 as illustrated in the upper part of FIG. 7B, but if the side of the spacer sheet 23 is attached to the tape 17 as illustrated in the upper part of FIG. 7A, chips C generated by dicing may be attached to the surface of the lens surface 2b as illustrated in the lower part of FIG. 7A.

In this case, the chips C are present in a space covered by the lens surface 2b, and thus it is difficult to remove the chips C, for example, even when the lens sheet 22 and the spacer sheet 23 are washed by spinner washing. On the other hand, if the side of the lens sheet 22 is attached to the tape 17, the chips C generated by dicing are present in a space opened outward as illustrated in the lower part of FIG. 7B, and thus it is possible to remove the chips C, for example, by performing spinner washing.

Figure 8A:
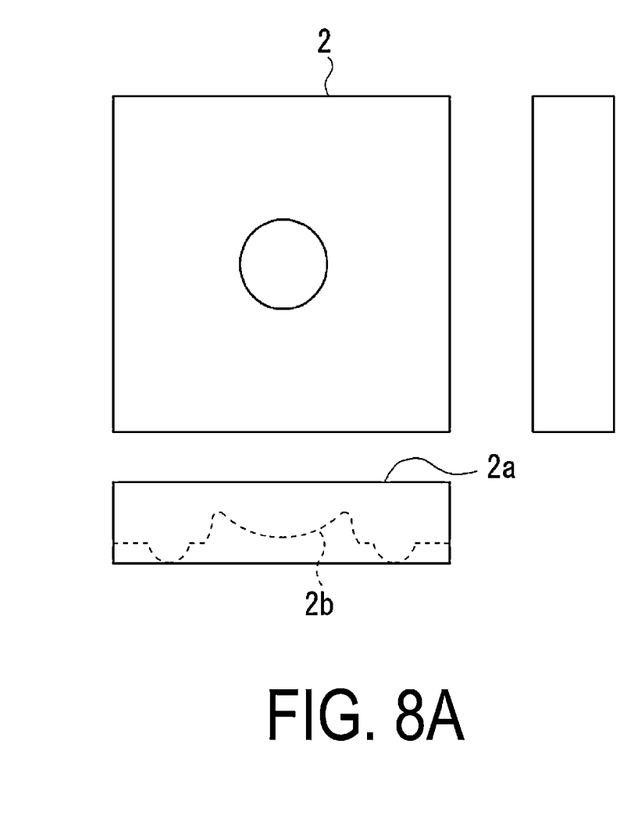
FIG. 8A and FIG. 8B each are a diagram illustrating a shape of an incident surface of the lens.
Figure 8B:
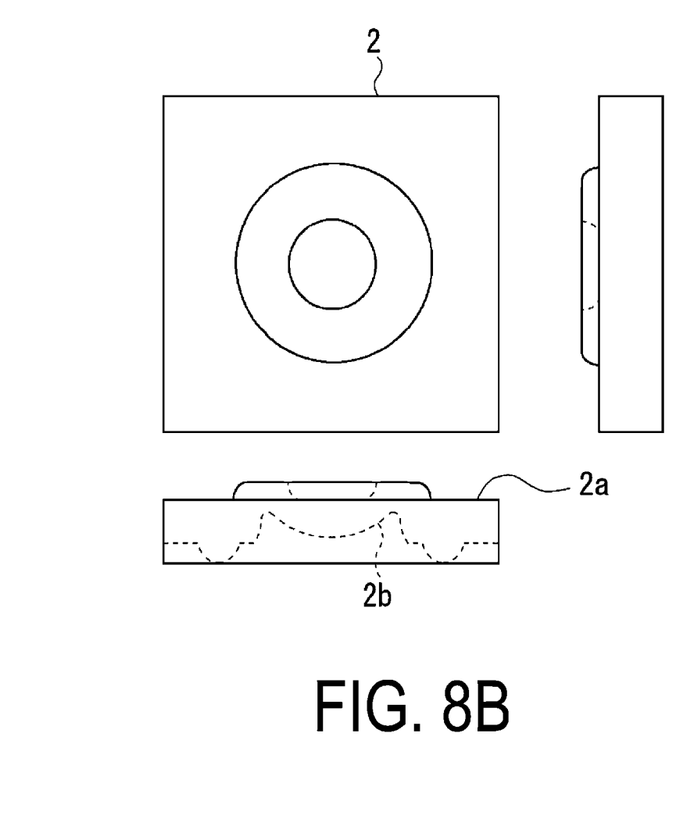

Furthermore, a region in the outer periphery of the lens surface 2b in the incident surface 2a of the lens portion 2 in the present example is substantially planar as illustrated in FIG. 8A, and thus sufficient strength can be ensured when the side of the lens sheet 22 is attached to the tape 17. If the incident surface 2a of the lens portion 2 has a concave-convex structure as illustrated in FIG. 8B, the contact area with the tape 17 is reduced, which makes it difficult to achieve the strength.

Figure 9A:
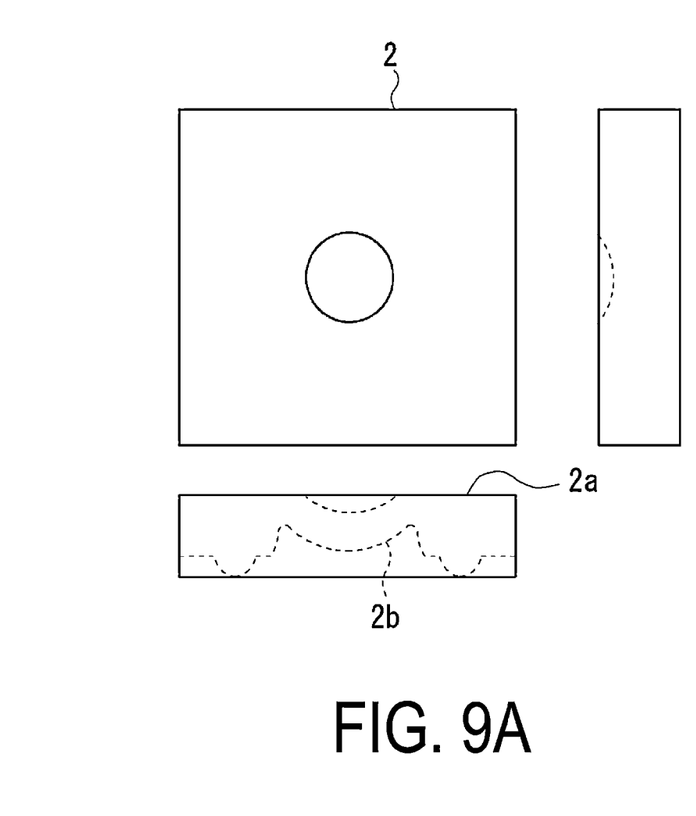
FIG. 9A and FIG. 9B each are a diagram illustrating another example of the shape of the incident surface of the lens.
Figure 9B:
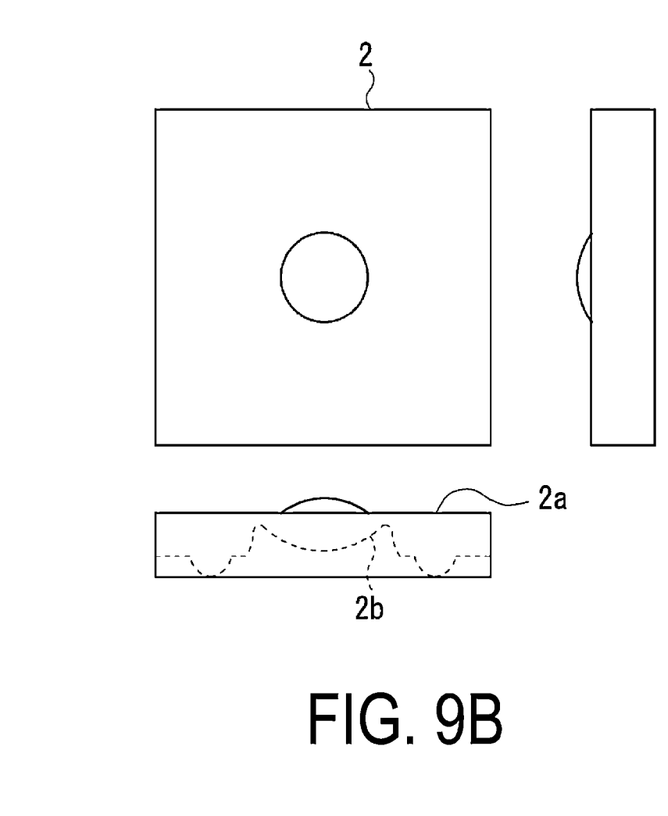

Note that the entire surface of the incident surface 2a of the lens portion 2 need not be planar. For example, as illustrated in FIG. 9A, in a case where a region in the outer periphery of the incident surface 2a is a flat surface, and a region in a central part of the incident surface 2a corresponding to the lens surface 2b has a shape recessed in a concave manner, it is possible to ensure sufficient strength when the side of the lens sheet 22 is attached to the tape 17. On the other hand, as illustrated in FIG. 9B, in a case where the region in the outer periphery of the incident surface 2a is a flat surface, and a region in the central part of the incident surface 2a corresponding to the lens surface 2b has a shape protruding in a convex manner, similarly to the case illustrated in FIG. 8B, the contact surface with the tape 17 is reduced, which makes it difficult to achieve the strength.

Note that in the example described above, it is assumed that by performing blasting in advance on the inclined surface 11c of the lower mold 11 in the forming mold, the surface roughness of the inner wall portion 3b is selectively made greater when the spacer portion 3 is molded, but in the embodiment of the present invention, blasting may be performed on the entire spacer sheet 23 after the spacer sheet 23 is molded by the forming mold or after the groove portion 3c is formed by half-cut of dicing. This makes it possible to make the surface roughness of a wider region of the spacer portion 3 greater, and thus it is possible to more reliably suppress flare and/or ghost. In this case, blasting on the entire spacer sheet 23 corresponds to the roughening in the present disclosure.

In the above-described example, when the groove portion 3c is formed by half-cut of dicing, the surface roughness of the groove portion 3c may be 0.3 µm or greater and 4 µm or less by appropriately selecting abrasive coating of the cutter. With this configuration, it is possible to make the surface roughness of not only the inner wall portion 3b but also the groove portion 3c greater and is possible to suppress generation of flare and/or ghost in the sensor S due to specular reflection of light having passed through the lens portion 2 from the entire region of the through hole of the spacer portion 3.

The embodiment of the lens unit according to the present disclosure have been described above, but each aspect disclosed in the present description can be combined with any other features disclosed in the present description.

CROSS-REFERENCE TO RELATED APPLICATION

This application is based upon and claims the benefit of priority of the prior Japanese Patent Application No. 2021-214840, filed on Dec. 28, 2021, and No. 2021-214679, filed on Dec. 28, 2021, the entire contents of which are incorporated herein by reference.

REFERENCE LIST

1 Lens unit
2 Lens portion
2a Incident surface
2b Lens surface
2c Outer peripheral portion
3 Spacer portion
3a Opening
3b Inner wall portion
3c Groove portion
3e Void portion
4 Holder
4a Base
11 Lower mold
11a Protrusion
12 Upper mold
22 Lens sheet
23 Spacer sheet

The invention claimed is:

1. A lens unit formed by joining a lens portion including a lens and a spacer portion including a through hole where light emitted from the lens passes through, wherein
   the spacer portion includes, in an end surface of the spacer portion where the lens portion is joined, an opening portion of the through hole and an inner wall portion, the inner wall portion is a wall surface of an outer edge of the opening portion, and
   the inner wall portion has a surface roughness greater than a surface roughness of an end surface of the spacer portion opposite to the end surface of the spacer portion where the lens portion is joined.

2. The lens unit according to claim 1, wherein the surface roughness of the inner wall portion is 0.3 µm or greater and 4 µm or less.

3. The lens unit according to claim 1, wherein a groove portion formed to extend perpendicular to a central axis of the through hole is provided in the end surface of the spacer portion opposite to the end surface of the spacer portion where the lens portion is joined, and the opening portion and the groove portion communicate with each other to form the through hole.

4. The lens unit according to claim 3, wherein a surface roughness of the groove portion is 0.3 µm or greater and 4 µm or less.

5. The lens unit according to claim 1, wherein the lens portion and the spacer portion are joined to each other by being fixed with an adhesive at radially outside the lens and the opening portion.

6. The lens unit according to claim 5, wherein
   on an end surface of the lens portion where the spacer portion is joined, an outer peripheral portion is provided to surround the lens, the outer peripheral portion is an annular-shaped convex portion abutting against the spacer portion when the lens portion is joined to the spacer portion, and
   a filling portion to be filled with an adhesive for fixing the lens portion and the spacer portion is provided on a further outer periphery of the outer peripheral portion.

7. The lens unit according to claim 1, wherein
   a region of the lens portion radially outside the lens on a surface of the lens portion opposite to a surface of the lens portion where the spacer portion is joined is formed in a planar shape, and
   the surface of the lens portion opposite to the surface of the lens portion where the spacer portion is joined is free of a portion protruding from the region formed in the planar shape.

8. A method for producing a lens spacer, the lens spacer including a through hole where light emitted from a lens passes through and including, in an end surface proximate to the lens, an opening portion of the through hole and an inner wall portion, the inner wall portion being a wall surface of an outer edge of the opening portion, the method comprising:
   opening portion molding of molding a molded product using an upper mold having a planar shape and a lower mold including a convex portion for forming the opening portion, and forming the opening portion and the inner wall portion in a first surface of the molded product, the convex portion having a substantially truncated cone shape; and
   groove portion forming of forming a groove portion extending perpendicular to a central axis of the opening portion in a second surface of the molded product, and causing the groove portion and the opening portion to communicate with each other, the second surface being a surface opposite to the first surface, wherein a side surface of the convex portion of the lower mold has a surface roughness greater than a surface roughness of the upper mold.

9. The method for producing the lens spacer according to claim 8, wherein the molded product is made of a resin material.

10. A method for producing a lens spacer, the lens spacer including a through hole where light emitted from a lens passes through and including, in an end surface proximate to the lens, an opening portion of the through hole and an inner wall portion, the inner wall portion being a wall surface of an outer edge of the opening portion, the method comprising:

opening portion molding of molding a molded product using an upper mold having a planar shape and a lower mold including a convex portion for forming the opening portion, and forming the opening portion and the inner wall portion in a first surface of the molded product, the convex portion having a substantially truncated cone shape;

groove portion forming of forming a groove portion extending perpendicular to a central axis of the opening portion in a second surface of the molded product, and causing the groove portion and the opening portion to communicate with each other, the second surface being a surface opposite to the first surface; and roughening a surface roughness of the inner wall portion.

11. The method for producing the lens spacer according to claim 10, wherein the molded product is made of a resin material.

12. A method for producing a lens unit, the lens unit formed by joining a lens portion including a lens and a spacer portion, the spacer portion including a through hole where light emitted from the lens passes through and including, in an end surface proximate to the lens, an opening portion of the through hole and an inner wall portion, the inner wall portion being a wall surface of an outer edge of the opening portion, the method comprising:

lens portion molding of molding the lens portion;

opening portion molding of molding the spacer portion using an upper mold having a planar shape and a lower mold including a convex portion for forming the opening portion, and forming the opening portion and the inner wall portion of the spacer portion, the convex portion having a substantially truncated cone shape;

groove portion forming of forming a groove portion extending perpendicular to a central axis of the opening portion in an end surface of the spacer portion opposite to an end surface of the spacer portion where the lens portion is joined, and causing the groove portion and the opening portion to communicate with each other; and joining the lens portion, and the spacer portion after the groove portion forming by fixing the lens portion and the spacer portion with an adhesive, wherein a side surface of the convex portion has a surface roughness greater than a surface roughness of the upper mold.

13. The method for producing the lens unit according to claim 12, wherein the spacer portion is made of a resin material.

14. The method for producing the lens unit according to claim 12, wherein in the joining, the lens portion and the spacer portion are joined to each other by being fixed with an adhesive at radially outside the lens and the opening portion.

15. The method for producing the lens unit according to claim 12, wherein in the lens portion molding, a lens portion sheet where a plurality of the lens portions are arranged is molded, in the opening portion molding, a spacer portion sheet where a plurality of the spacer portions are arranged is molded, and the opening portion and the inner wall portion of each of the plurality of the spacer portions are formed, in the groove portion forming, a plurality of the groove portions are formed, and the opening portion of each of the plurality of the spacer portions and the corresponding one of the plurality of the groove portions are caused to communicate with each other, in the joining, the lens portion sheet, and the spacer portion sheet after the groove portion forming are fixed with an adhesive to join each of the plurality of the lens portions and the corresponding one of the plurality of the spacer portions, and the method further comprises cutting the lens portion sheet and the spacer portion sheet that are fixed with the adhesive by dicing into a combination including each of the plurality of the lens portions and the corresponding one of the plurality of the spacer portions that are joined.

16. The method for producing the lens unit according to claim 15, wherein in the cutting, of the lens portion sheet, and the spacer portion sheet after the groove portion forming that are fixed with the adhesive, dicing is performed after the lens portion sheet is attached to a tape and fixed.

17. A method for producing a lens unit, the lens unit formed by joining a lens portion including a lens and a spacer portion, the spacer portion including a through hole where light emitted from the lens passes through and including, in an end surface proximate to the lens, an opening portion of the through hole and an inner wall portion, the inner wall portion being a wall surface of an outer edge of the opening portion, the method comprising:

lens portion molding of molding the lens portion;

opening portion molding of molding the spacer portion using an upper mold having a planar shape and a lower mold including a convex portion for forming the opening portion, and forming the opening portion and the inner wall portion of the spacer portion, the convex portion having a substantially truncated cone shape;

groove portion forming of forming a groove portion extending perpendicular to a central axis of the opening portion in an end surface of the spacer portion opposite to an end surface of the spacer portion where the lens portion is joined, and causing the groove portion and the opening portion to communicate with each other;

roughening a surface roughness of the inner wall portion; and joining the lens portion, and the spacer portion after the groove portion forming with an adhesive.

18. The method for producing the lens unit according to claim 17, wherein the spacer portion is made of a resin material.

19. The method for producing the lens unit according to claim 17, wherein in the joining, the lens portion and the spacer portion are joined to each other by being fixed with an adhesive at radially outside the lens and the opening portion.

20. The method for producing the lens unit according to claim 17, wherein
- in the lens portion molding, a lens portion sheet where a plurality of the lens portions are arranged is molded,
- in the opening portion molding, a spacer portion sheet where a plurality of the spacer portions are arranged is molded, and the opening portion and the inner wall portion of each of the plurality of the spacer portions are formed,
- in the groove portion forming, a plurality of the groove portions are formed, and the opening portion of each of the plurality of the spacer portions and the corresponding one of the plurality of the groove portions are caused to communicate with each other,
- in the joining, the lens portion sheet, and the spacer portion sheet after the groove portion forming are fixed with an adhesive to join each of the plurality of the lens portions and the corresponding one of the plurality of the spacer portions, and
- the method further comprises cutting the lens portion sheet and the spacer portion sheet that are fixed with the adhesive by dicing into a combination including each of the plurality of the lens portions and the corresponding one of the plurality of the spacer portions that are joined.

* * * * *